May 10, 1955
D. L. BALL
2,707,788
BED POST AND RAIL COUPLING MEANS
Filed Sept. 13, 1950
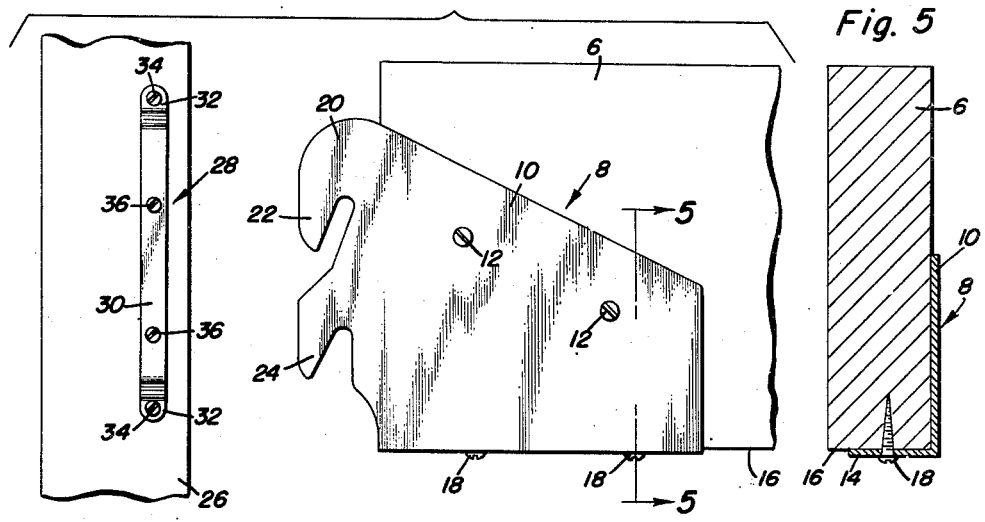
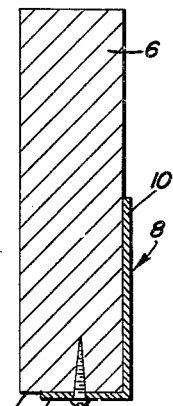
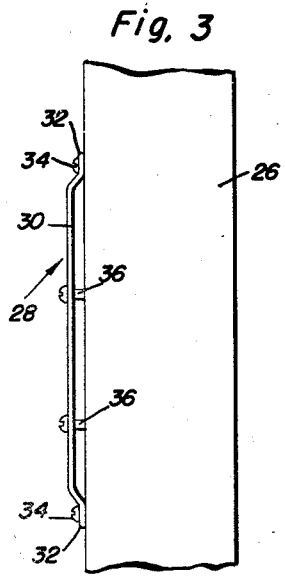
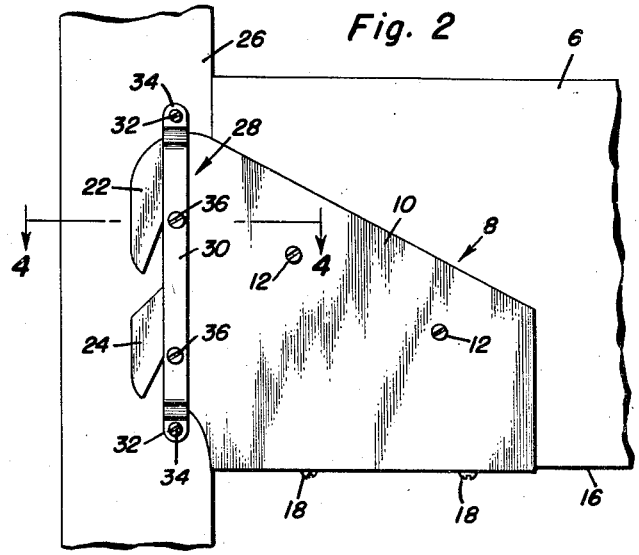
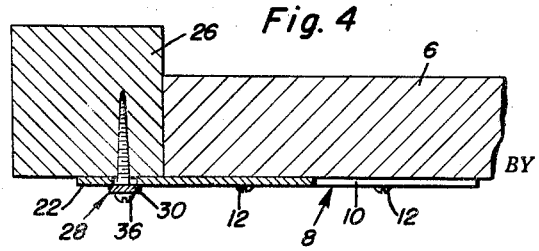
David L. Ball
INVENTOR.

United States Patent Office 2,707,788
Patented May 10, 1955

2,707,788
BED POST AND RAIL COUPLING MEANS

David L. Ball, Gallup, N. Mex.

Application September 13, 1950, Serial No. 184,661

2 Claims. (Cl. 5—296)

The present invention relates to certain new and useful improvements in coupling means which is expressly, though not necessarily, adapted for securely and adequately joining an end of a bedstead rail with a vertical bed post.

It is a matter of common knowledge that rail and post joining devices in the class of bedsteads are of many and varied styles and forms and, lacking space, no attempt will be made to provide a recitation of specific coupling devices which are commonly known. It may be said, however, that, for the most part, beds in common use in the trade usually have mortises formed in the rail and post respectively. A circular saw is ordinarily employed for rabbeting out the mortise or recess. The shank of a hook equipped plate is fastened in one mortise, generally the one in the end of the bed rail, and the usual coupling hooks project beyond the rail and telescope into the recess or mortise in the post wherein metal dowel pins constitute keepers for the hooks. Sometimes the pins give way and in some instances, particularly where they are wood, they shear and break off. In many instances where the mortise in the rail end is employed, the pins which hold the plate in the mortise are so close to the end of the rail that breakage of parts occurs and impairs the strength and utility of the rail.

Those engaged in this line of endeavor and in attempting to improve on rail coupling means of the form described have utilized various kinds of fixtures and brackets none of which is strictly conformable with the instant invention. It follows that the present invention has to do with improved structural coupling means in which manufacturers and users will find their essential needs fully met, contained and successfully available.

More specifically, novelty is predicated on the one hand on a fixture which takes the form of a flat plate which has projecting assembling and retaining hooks on one end and which has a lateral flange at the bottom to engage beneath the bottom edge of the bedstead rail.

Novelty, in addition, is predicated upon a complemental post bracket or fixture which is a simple bent strap functioning somewhat like a stirrup for the hooks on said plate and having relatively large wood screws serving as anchors for the hooks.

Other objects and advantages will become more readily apparent from the following description and the accompanying drawings.

In the accompanying sheet of drawings wherein like numerals are employed to designate like parts throughout the views:

Figure 1 is an exploded view showing the post, bedstead rail and the respective coupling fixtures thereon;

Figure 2 is a view based on Figure 1 and showing the fixtures coupled together in joining the rail to the post;

Figure 3 is a fragmentary elevational view of the bed post and the special anchoring bracket thereon;

Figure 4 is a horizontal fragmentary section taken approximately on the plane of the line 4—4 of Figure 2, looking in the direction of the arrows; and Figure 5 is a vertical section on the approximate line 5—5 of Figure 1, looking in the direction of the arrows.

In the drawings the bedstead horizontal rail, which is conventional, is denoted by the numeral 6. The special coupling fixture attached thereto is denoted by the numeral 8 and comprises a flat attaching plate 10 secured in place partially by wood screws 12—12. The lower edge of the plate has a ledge flange 14 which underlies the lower edge portion 16 of the rail and which is secured thereto by additional wood screws 18. An edge portion of the plate, the portion 20 projects beyond the rail and is provided with customarily positioned and shaped coupling hooks 22 and 24. Instead of having the plate fit into a mortise, the plate is superimposed against the rail and strengthened by the reinforcing flange 14.

The bed post 26 is conventional and this is provided on one side, the side which may be referred to as the "inner" side, with a hanger or anchoring bracket or fixture 28. This is a strap of metal of appropriate length and strength. The intermediate position is offset and spaced in parallelism to the post to provide an appropriate adapter 30 and the offset end portions 32—32 are placed in firm contact with the post, and secured thereto by wood screws 34—34. Additional longer wood screws 36 pass through the adapter stirrup 30 and into the post as best shown in Figure 4.

In Figure 4 the transverse end of the rail is shown in firm abutting contact with a coacting flat face of the post and, obviously, by hooking the hooks 22 and 24 over the screws 36 and 36 the latter constitute anchoring and keeper elements for said hooks.

With the arrangement shown an adaptation is had which is possessed of the requisite characteristics of simplicity, economy, durability and the ever essential time saving factor. Almost anyone without skill may apply and remove fixtures of the type herein shown since all that is necessary is to screw the fixtures on the available flat surfaces of the rails and posts respectively. Likewise repairs and replacements may be made and, particularly, much time and expense will be saved at the source of manufacture since it is unnecessary to saw the rails and posts as is ordinarily done.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

1. In a structure of the class shown, in combination, a bedpost of polygonal cross-sectional form, a coupling fixture, said fixture comprising an elongated strap having end portions fastened to one flat side of said post and having an intermediate portion in spaced parallelism relative to said post, said intermediate portion constituting a stirrup, and wood screws passing through said stirrup and into said post, said wood screws having predetermined spaced relationship, and constituting keepers, a flat sided rail having a flat end abutting said post, a coupling plate fastened to one flat side of said rail and having an extending end portion bridging the joint between the rail and the post and having hooks fitting in the space between the post and stirrup and releasably engaged with said keepers, said coupling plate having a right angularly extending flange along its lower edge, said flange being superimposed against and secured to the adjacent lower edge of said rail and one transverse end of said flange terminating flush with an adjacent end of said rail.

2. For use with a bedpost of polygonal cross-sectional form having a coupling fixture fastened to one of its sides, said fixture comprising an elongated strap having its ends engaging said post, with the intermediate portion in spaced parallelism with the post, and wood screws constituting keepers passed through the intermediate portion of said strap and into the post; a bedstead rail having at least one vertically disposed flat side, and a coupling plate having a vertical flat side superimposed against and secured to said vertically disposed flat side of said rail, said plate being provided on its lower longitudinal edge portion with a flange commensurate in length with the length of said plate and projecting at right angles relative to said plate, said flange underlying, abutting and being secured to a lower edge portion of said rail, one end portion of said plate extending beyond an adjacent end portion of said rail and being provided with coupling hooks adapted for engagement with the keepers in the aforementioned coupling fixture.

References Cited in the file of this patent

UNITED STATES PATENTS

| 1,551,026 | Greek | Aug. 25, 1925 |

FOREIGN PATENTS

| 3,723 | Great Britain | Feb. 15, 1907 |
| 19,152 | Australia | Apr. 8, 1930 |
| 138,276 | Great Britain | Feb. 5, 1920 |
| 570,616 | Germany | Feb. 17, 1933 |